United States Patent
Choi et al.

(10) Patent No.: US 12,476,473 B2
(45) Date of Patent: Nov. 18, 2025

(54) ELECTRONIC DEVICE HAVING STRUCTURE TO MINIMIZE POWER LOSS DURING BATTERY CHARGING AND DISCHARGING

(71) Applicant: SAMSUNG ELECTRONICS CO., LTD., Suwon-si (KR)

(72) Inventors: Sungwoo Choi, Suwon-si (KR); Gunhee Park, Suwon-si (KR); Yongsuk Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 680 days.

(21) Appl. No.: 17/832,075

(22) Filed: Jun. 3, 2022

(65) Prior Publication Data

US 2023/0067606 A1 Mar. 2, 2023

Related U.S. Application Data (63) Continuation of application No. PCT/KR2022/006553, filed on May 9, 2022.

(30) Foreign Application Priority Data

Sep. 2, 2021 (KR) .................. 10-2021-0116807

(51) Int. Cl.
 *H02J 7/00* (2006.01)
(52) U.S. Cl.
 CPC ............ *H02J 7/00* (2013.01); *H02J 7/00032* (2020.01); *H02J 7/0045* (2013.01); *H02J 7/00712* (2020.01); *H02J 7/00308* (2020.01)
(58) Field of Classification Search
 CPC ........ H02J 7/00; H02J 7/0045; H02J 7/00712; H02J 7/00308; H02J 7/00032
 (Continued)

(56) References Cited

U.S. PATENT DOCUMENTS 10,389,007 B1 8/2019 Choi et al.
10,644,520 B2 5/2020 Yang et al.
(Continued)

FOREIGN PATENT DOCUMENTS

JP 2012033549 A 2/2012
KR 101012728 B1 1/2011
(Continued)

OTHER PUBLICATIONS

Extended European Search Report corresponding to Application No. 22864812.7-1002; Dated Sep. 25, 2024.
(Continued)

*Primary Examiner* — Drew A Dunn
*Assistant Examiner* — Aaron Piggush
(74) *Attorney, Agent, or Firm* — CANTOR COLBURN LLP (57) ABSTRACT

In various embodiments, an electronic device may include a battery pack including a charging terminal, a discharging terminal, and at least one battery cell. A first substrate is connected to the charging terminal and a second substrate is connected to the discharging terminal. An external connector is mounted on the first substrate and connected to an external power supply device. A first internal connector is mounted on the first substrate and connected to the charging terminal. A second internal connector is mounted on the second substrate and connected to the discharging terminal. A charging circuit is mounted on the first substrate and configured to receive a first power signal from the power supply device through the external connector, to adjust a current and/or voltage of the received first power signal, and to output the adjusted first power signal to the charging terminal through the first internal connector. A system of the electronic device is mounted on the second substrate. A power management circuit is mounted on the second sub-
(Continued)

strate and configured to receive a second power signal for the system to operate from the discharging terminal through a second internal connector, and to supply the received second power signal to the system.

18 Claims, 5 Drawing Sheets

(58) Field of Classification Search
USPC .......................... 320/113, 107, 114, 134, 136
See application file for complete search history.

(56) References Cited

U.S. PATENT DOCUMENTS

| | | | |
|---|---|---|---|
| 10,819,121 | B2 | 10/2020 | Zhang |
| 11,075,535 | B2 | 7/2021 | Kwak et al. |
| 2011/0045322 | A1 | 2/2011 | Baek et al. |
| 2017/0038803 | A1 | 2/2017 | Bhardwaj |
| 2018/0074564 | A1* | 3/2018 | Paparrizos ................ H02J 7/00 |
| 2020/0036198 | A1* | 1/2020 | Kim .................... H02J 7/00714 |
| 2020/0284841 | A1 | 9/2020 | Moon et al. |
| 2021/0081000 | A1* | 3/2021 | Wang .................. H01M 50/298 |
| 2021/0367436 | A1* | 11/2021 | Qu ........................ H02J 7/0042 |
| 2022/0085598 | A1 | 3/2022 | Liu et al. |
| 2022/0311062 | A1* | 9/2022 | Qu ........................ H02J 7/0042 |

FOREIGN PATENT DOCUMENTS

| | | |
|---|---|---|
| KR | 20180017551 A | 2/2018 |
| KR | 20180074050 A | 7/2018 |
| KR | 20190140209 A | 12/2019 |
| KR | 20210107076 A | 8/2021 |
| KR | 20220012591 A | 2/2022 |
| WO | 2020199104 A1 | 10/2020 |
| WO | 2021135949 A1 | 7/2021 |
| WO | 2023033303 A1 | 3/2023 |

OTHER PUBLICATIONS

International Search Report and Written Opinion for International Application No. PCT/KR2022/006553; Date of Search: Aug. 17, 2022; with English Translation of Search; 9 pages.

* cited by examiner

ELECTRONIC DEVICE HAVING STRUCTURE TO MINIMIZE POWER LOSS DURING BATTERY CHARGING AND DISCHARGING

CROSS-REFERENCE TO RELATED APPLICATION(S)

This application is a continuation application, claiming priority under § 365(c), of an International application No. PCT/KR2022/006553, filed on May 9, 2022, which is based on and claims the benefit of a Korean patent application number 10-2021-0116807, filed on Sep. 2, 2021, in the Korean Intellectual Property Office, the disclosure of which is incorporated by reference herein in its entirety.

TECHNICAL FIELD

Various embodiments relate to an electronic device having a structure for minimizing power loss occurring when a battery is charged and discharged.

BACKGROUND ART

An electronic device may be connected to a power supply device through a connector (for example, USB Type-C connector). A charging circuit of the electronic device may charge the battery of the electronic device by using power supplied through the connector. The charging circuit may support fast charging by which the battery can be fully charged within a short period of time. For example, the electronic device may use constant current ("CC") and constant voltage ("CV") charging profiles. The electronic device may perform fast charging in such a manner that, if the voltage of the battery is lower than a designated target voltage value, the current of a power signal output from the charging circuit to the battery may be constantly maintained at a designated current value (hereinafter, referred to as "charging current value"). The target voltage value may be equal to the voltage difference between the positive (+) electrode and the negative (-) electrode of the battery when the battery is in a full charge state. The full charge may refer to a state of charge ("SOC") when the battery charge amount reaches the configured maximum capacity (100%) without the risk of burning or exploding. If the battery voltage rises to the target voltage value while the battery is charged in the CC mode as described above, the electronic device may perform charging in such a manner that the current of the power signal output from the charging circuit may be gradually reduced from the charging current value so as to maintain the battery voltage at the target voltage value. If the current of the power signal output from the charging circuit is lowered to the current value for charging completion while the battery is charged in the CV mode as described above, the electronic device may confirm that the battery is fully charged and may complete battery charging.

DISCLOSURE

Technical Problem

A connector may be mounted on a first substrate (or sub substrate), and a charging circuit may be mounted on a second substrate (or main substrate) separate from the first substrate. A power supply line may be disposed between the two substrates such that external power may be supplied from the connector to the charging circuit. During battery charging, power loss may occur in a charging path extending from the connector to the battery. For example, power loss may occur in the charging path due to a resistance component caused by the length of the power supply line. Such power loss may increase the internal temperature of the electronic device.

The charging circuit may be mounted on the first substrate together with the connector in order to reduce power loss during charging. However, the system (for example, processor and memory) of the electronic device may be mounted on the second substrate, and power loss may occur in the discharging path extending from the battery to the system on the second substrate. For example, a power management integrated circuit ("PMIC") for supplying power from the battery to the system may be mounted on the first substrate together with the charging circuit. A power supply line may be disposed between the two substrates such that power needed by the system may be delivered from the PMIC to the system. Power loss may occur in the discharging path due to a resistance component caused by the length of the power supply line, and this may erroneously stop the system from operating or turn the system off.

In various embodiments, an electronic device may have a structure configured to minimize power loss during charging, to suppress heating, and/or to improve charging efficiency.

In various embodiments, an electronic device may have a structure configured to minimize power loss during discharging and/or to enable a system to operate without interruption or error.

Technical problems to be solved by the disclosure are not limited to the above-mentioned technical problems, and other technical problems not mentioned herein will be clearly understood from the following description by those skilled in the art to which the disclosure pertains.

Technical Solution

In various embodiments, an electronic device may include a housing and a battery pack positioned inside the housing and including a charging terminal, a discharging terminal, and at least one battery cell. A first substrate is positioned inside the housing and connected to the charging terminal and a second substrate is positioned inside the housing and connected to the discharging terminal. An external connector is mounted on the first substrate and connected to an external power supply device. A first internal connector is mounted on the first substrate and connected to the charging terminal. A second internal connector is mounted on the second substrate and connected to the discharging terminal. A charging circuit is mounted on the first substrate and configured to receive a first power signal from the power supply device through the external connector, to adjust a current and/or voltage of the received first power signal, and to output the adjusted first power signal to the charging terminal through the first internal connector. A system of the electronic device is mounted on the second substrate. A power management circuit is mounted on the second substrate and configured to receive a second power signal for the system to operate from the discharging terminal through a second internal connector, and to supply the received second power signal to the system.

Advantageous Effects

Various embodiments of the disclosure may provide an electronic device having a structure configured to minimize power loss during charging, to suppress heating, and/or to improve charging efficiency. Various embodiments may provide an electronic device having a structure configured to minimize power loss during discharging and to enable a system to operate without interruption or error. Various other advantageous effects identified explicitly or implicitly through the disclosure may be provided.

DESCRIPTION OF DRAWINGS

The above and other advantages and features of this disclosure will become more apparent by describing in further detail embodiments thereof with reference to the accompanying drawings, in which.

MODE FOR INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "first component," "first region," "first layer," or "first section" discussed below could be termed a second element, component, region, layer, or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
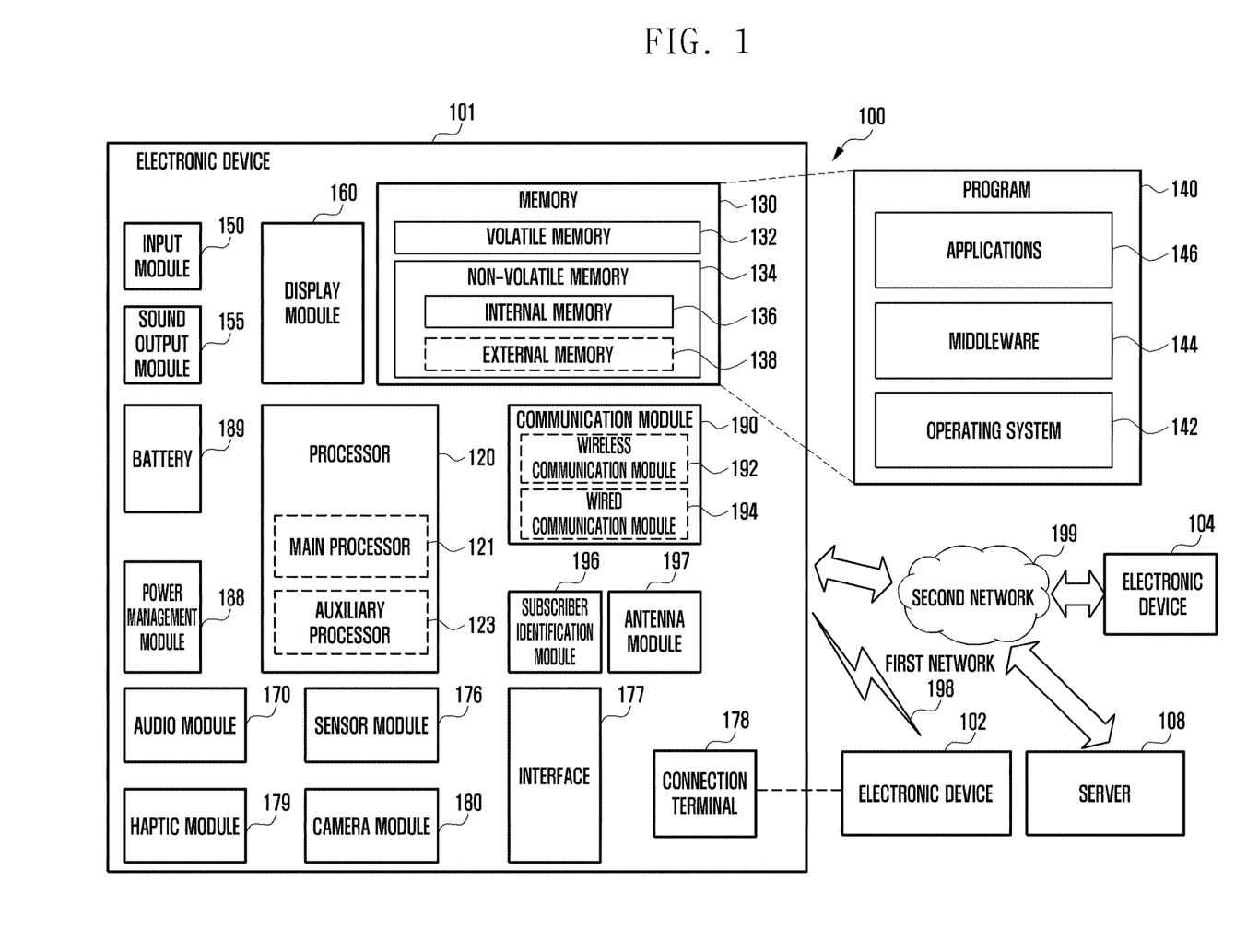
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
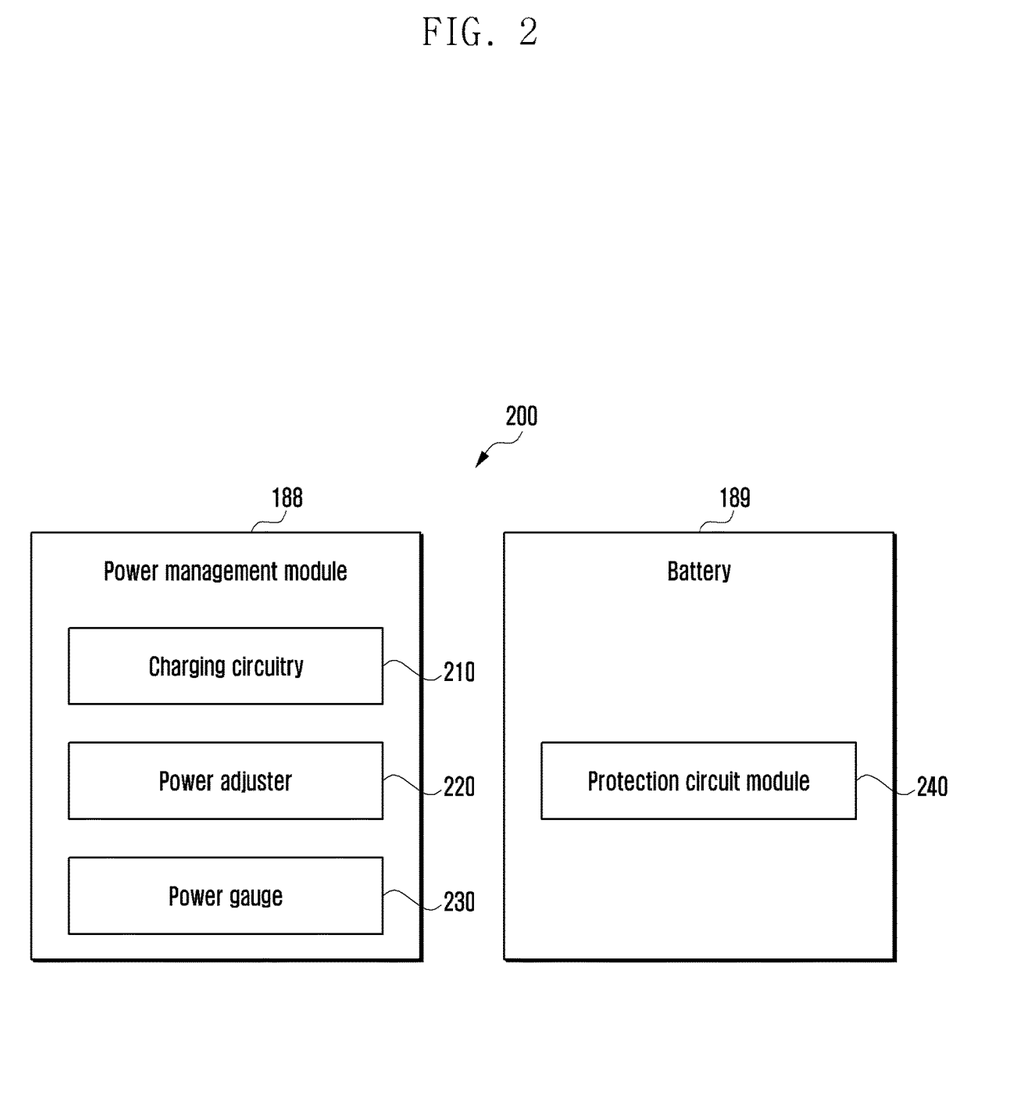
FIG. 2 is a block diagram illustrating a power management module and a battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
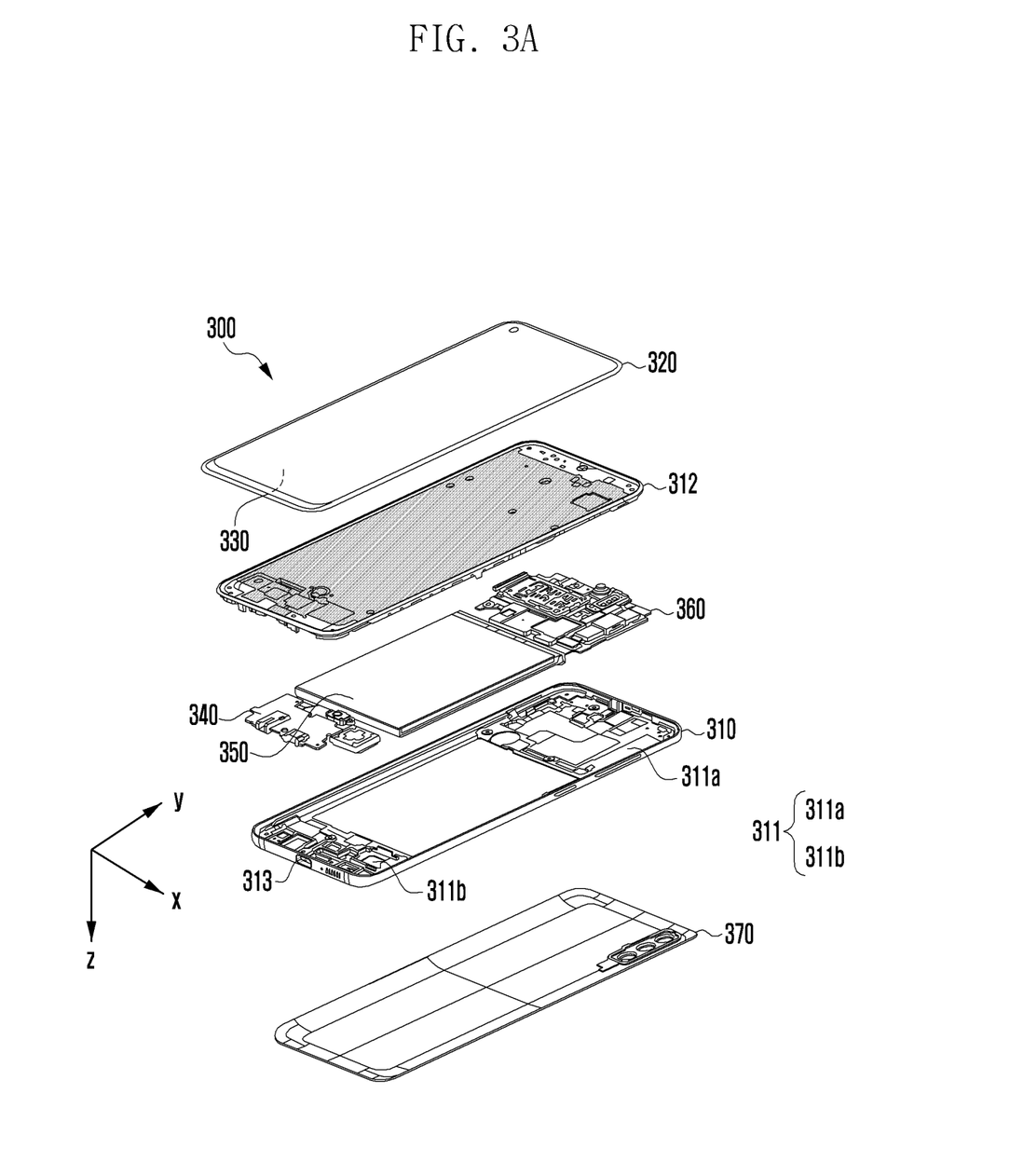
FIG. 3A is an exploded perspective diagram illustrating an electronic device according to an embodiment.
Figure 3B:
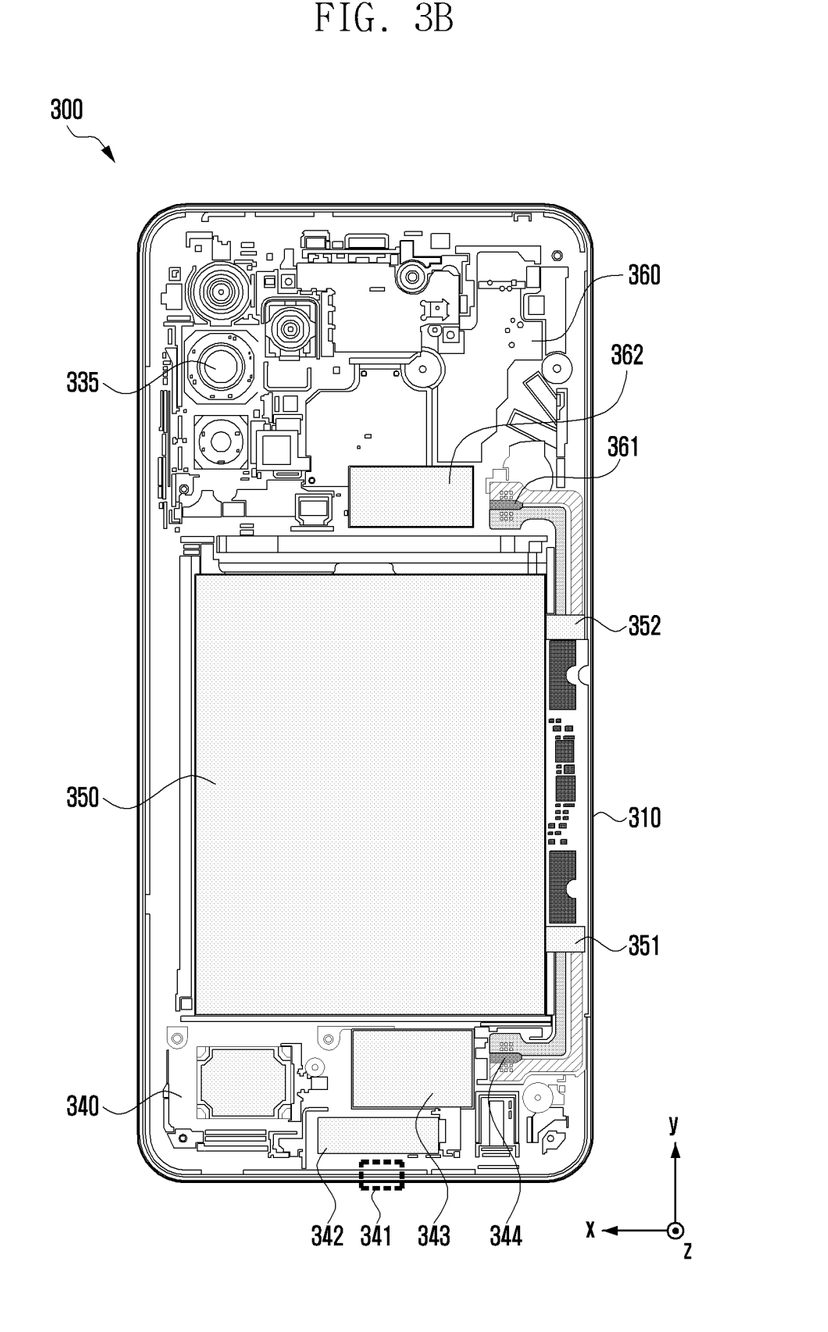
FIG. 3B illustrates a battery charging and discharging structure disposed on a rear side of the electronic device of FIG. 3A.

FIG. 3A is an exploded perspective diagram illustrating an electronic device 300 according to an embodiment. FIG. 3B illustrates a battery charging and discharging structure disposed on the rear side of the electronic device 300.

Referring to FIGS. 3A and 3B, the electronic device 300 (e.g., the electronic device 101 in FIG. 1) may include a side bezel structure 310 (or a side frame), a first support member 311 (or a first support frame), a second support member 312 (or a second support frame), a front plate 320 (or a front cover), a display 330 (e.g., the display module 160 in FIG. 1), a camera module 335 (e.g., the camera module 180 in FIG. 1), at least one printed circuit board 340, 360, a battery pack 350 (e.g., the battery 189 in FIG. 2), and a rear plate 370 (or a rear cover). The front plate 320 may form a first surface (or a front surface) of the electronic device 300 facing in a first direction, and the rear plate 370 may form a second surface (or a rear surface) of the electronic device 300 facing in a second direction opposite the first direction. The side bezel structure 310 may be made of a combination of a metal (e.g., stainless steel (e.g., SUS)) and a polymer and may form a side surface surrounding a space between the first surface and the second surface. According to an embodiment, a structure including the first surface, the second surface, and the side surface may be referred to as a housing (or a housing structure). In some embodiments, at least one (e.g., the first support member 311 or the second support member 312) of the components of the electronic device 300 may be omitted, or other components may be additionally included in the electronic device 300.

In an embodiment, the printed circuit boards 340, 360 may be arranged to be supported by the first support member 311 and/or the second support member 312.

In an embodiment, the first support member 311 may be coupled to the side bezel structure 310. The first support member 311 may include a structure (e.g., a metal or a polymer) extending from the side bezel structure 310. The first support member 311 may be made of, for example, a metal and/or a non-metal material (e.g., a polymer). The display 330 may be coupled to one surface of the second support member 312 and the printed circuit boards 340, 360 may be coupled to the other surface thereof. According to an embodiment, the printed circuit boards 340, 360 may define, when viewed in FIG. 3B, a first substrate (or a sub board) 340 and a second substrate (or a main board) 360 respectively disposed below and above with the battery pack 350 interposed therebetween. As shown in FIG. 3A, an aperture, opening, or hole 313 may be provided at a lower side of the side bezel structure 310 adjacent to the first substrate 340. The electronic device 300 may be electrically connected to an external device (e.g., a power supply device) through an external connector introduced into the electronic device 300 through the hole 313. The first support member 311 may include a second substrate support member 311a supporting the second substrate 360 and a first substrate support member 311b supporting the first substrate 340.

In an embodiment, the battery pack 350 may be disposed to be supported by the first support member 311 and/or the second support member 312. The battery pack 350 is a device for supplying power to at least one component of the electronic device 300 and may include a rechargeable secondary battery. In some embodiments, the battery pack 350 may be positioned between the first substrate 340 and the second substrate 360, as shown in FIGS. 3A-3B. The battery pack 350 may be disposed on substantially the same plane as the first and second substrates 340, 360.

Referring to FIG. 3B, an external connector 341, an overvoltage protection circuit 342, a charging circuit 343, and a first internal connector 344 may be disposed on the first substrate 340. The external connector 341 may be configured to transmit and receive data communication and power. The first internal connector 344 may be electrically connected to a charging terminal (or a first terminal) 351 provided as part of the battery pack 350. The battery pack 350 may receive a power signal from the first substrate 340 through the charging terminal 351 and may charge one or more battery cell(s) using the received power signal. A second internal connector 361 and a power management circuit 362 may be disposed on the second substrate 360. The second internal connector 361 may be electrically connected to a discharge terminal (or a second terminal) 352 provided as part of the battery pack 350. The battery pack 350 may transmit a power signal of one or more battery cell(s) to the second substrate 360 through the discharge terminal 352.

The charging terminal 351 and the discharging terminal 352 are illustrated as being located adjacent to the right side of the side bezel structure 310 when viewed in FIG. 3B, but those of skill in the art will appreciate that the positioning of these terminals is not limited thereto. For example, the positions of the charging terminal 351 and the discharging terminal 352 may be changed according to positions where the internal connectors 344, 361 are provided. The charging terminal 351 may be located closer to the first internal connector 344 than shown in FIG. 3B or may be directly connected to the first internal connector 344 without a power line. The discharging terminal 352 may also be located closer to the second internal connector 361 or may be directly connected to the second internal connector 361 without a power line.

Figure 4:
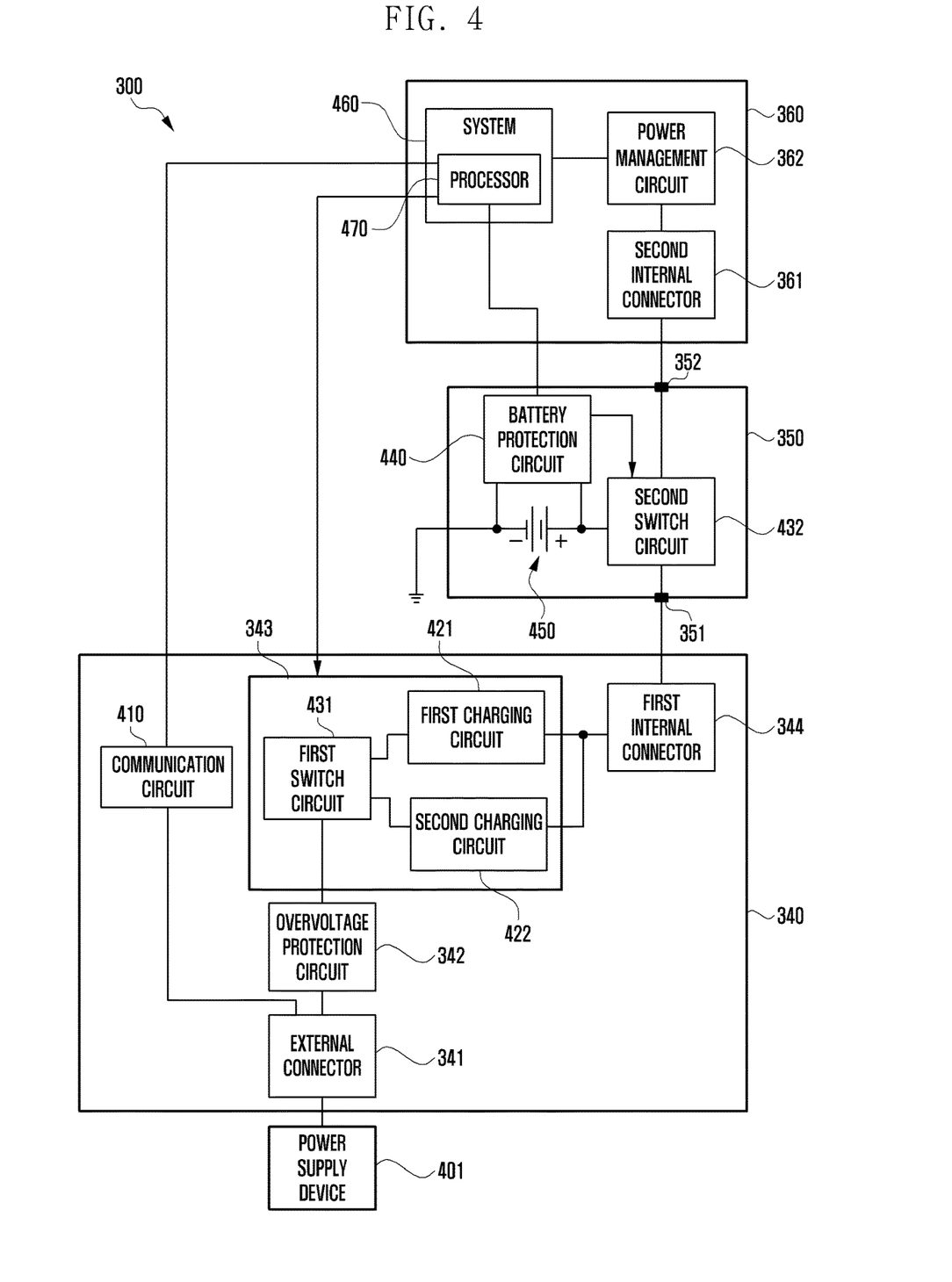
FIG. 4 is a block diagram illustrating components constituting an electronic device according to an embodiment.

FIG. 4 is a block diagram illustrating components constituting the electronic device 300 according to an embodiment. Referring to FIG. 4, the electronic device 300 may include the first substrate 340, the battery pack 350, and the second substrate 360. The first substrate 340 may include the external connector 341, the overvoltage protection circuit 342, the charging circuit 343, the first internal connector 344, and a communication circuit 410. The battery pack 350 may include the charging terminal 351, the discharging terminal 352, a second switch circuit 432, a battery protection circuit 440, and one or more battery cells 450. The second substrate 360 may include the second internal connector 361, the power management circuit 362, and a system (or a load circuit) 460. The system 460 collectively refers to electronic components driven using power signals received through the power management circuit 362 and may include, for example, a processor 470 (e.g., the processor 120 in FIG. 1).

The external connector 341 may include a power pin for battery charging and a signal pin for power delivery ("PD") communication. In some embodiments, the external connector 341 may be configured as a socket according to universal serial bus ("USB") Type-C, although other socket configurations and the like may be employed without departing from the scope of the present disclosure (e.g., USB Type-A, USB Type-B, non-USB Type connectors, etc.). The external connector 341 may be coupled to a plug of a cable introduced through the hole 313.

The communication circuit 410 (e.g., a USB controller) may identify the type of an external device connected through the external connector 341 by using a signal pin (e.g., a configuration channel (CC)1 pin and a (CC)2 pin). For example, the communication circuit 410 may identify that the external device connected through the external connector 341 is a power supply device 401 capable of supplying power through an electrical state (e.g., a current value) of the signal pin. The communication circuit 410 may transmit identification information of the external device connected to the external connector 341, to the processor 470. The processor 470 may perform PD communication for rapidly charging the battery cell 450 based on the identification information. For example, the processor 470 may perform PD communication with the external device through the communication circuit 410, thereby performing an operation of negotiating which of the external device and the electronic device 300 is a source for supplying power and a sink for receiving power. When the electronic device 300 is determined to be the sink, the processor 470 may perform PD communication with the external device through the communication circuit 410, thereby performing an operation of negotiating a power value to be transmitted by the external device to the electronic device 300. For example, the processor 470 may determine that a power signal having a power value (e.g., 20V, 3 A) greater than a default value (e.g., 5V, 500 mA) is supplied to the electronic device 300 through a power pin (e.g., USB bus voltage "VBUS") of the external connector 341 through power negotiation with the external device.

In some embodiments, the communication circuit 410 may built into the charging circuit 343. For example, in some embodiments, the communication circuit 410 may be built into a first charging circuit 421 of the charging circuit 343.

When the external device is a power supply device 401 (e.g., the electronic device 102 in FIG. 1), such power supply device 401 may include an adapter. For example, the adapter may convert a current characteristic of a power signal input from an external power source from alternating current ("AC") to direct current ("DC") and may adjust the voltage of the power signal to a designated voltage value. The adapter (e.g., a travel adapter ("TA")) may perform a variable function (e.g., programmable power supply ("PPS")) of changing the power value (e.g., current and/or voltage) of the power signal to be supplied to the electronic device 300 according to the control of the electronic device 300. For example, the adapter may reduce or increase a current of a power signal to be output to the electronic device 300 in response to a control signal received from the processor 470 through the communication circuit 410. The adapter may be a model in which a variable function is not supported and the current and/or voltage of the power signal are fixed to a designated value and output. When the adapter is a model supporting the variable function, the voltage (or current) of the power signal to be output by the adapter of the power supply device 401 to the electronic device 300 may be changed to a voltage value (or a current value) configured to charge the battery cell 450. When the adapter is a model that does not support the variable function, the charging circuit 343 may adjust the voltage (or current) of the power signal received from the power supply device 401 to a voltage value (or current value) configured to charge the battery cell 450.

The overvoltage protection circuit 342 may be connected to the power pin of the external connector 341 to block the overvoltage from flowing into the electronic device 300, thereby preventing damage to an electronic component (e.g., the charging circuit 343). For example, the overvoltage protection circuit 342 may include a Zener diode.

The charging circuit 343 (e.g., the power management module 188 in FIGS. 1 and 2) may receive a power signal from the external connector 341 through the overvoltage protection circuit 342. For example, the charging circuit 343 may receive a power signal having a power value determined through power negotiation between the processor 470 and the power supply device 401 from the power supply device 401 through the external connector 341. The charging circuit 343 may adjust the power value of the received power signal based on the control of the processor 470. The charging circuit 343 may output the power signal of which power value is adjusted to the charging terminal 351 through the first internal connector 344.

In an embodiment, the charging circuit 343 may include a first charging circuit 421, a second charging circuit 422, and a first switch circuit 431. The first charging circuit 421 may include a buck boost circuit (or a switching charging circuit) configured to adjust and output the current and/or voltage of the input power signal. In an embodiment, the first charging circuit 421 may support constant current ("CC") and constant voltage ("CV") charging based on the control of the processor 470. For example, while the charging mode is a CC mode, the first charging circuit 421 may constantly maintain the current of the power signal output from the first charging circuit 421 to the battery cell 450 at a charging current value configured by the processor 470, so that the voltage of the battery cell 450 increases to a designated target voltage value. When the charging mode is converted from the CC mode to the CV mode by the voltage of the battery cell 450 reaching the target voltage value, the first charging circuit 421 may gradually lower the current of the power signal output from the first charging circuit 421 under the control of the processor 470, so that the voltage of the battery cell 450 can be maintained at the target voltage value. When the current of the power signal input to the battery cell 450 is lowered to a designated charging completion current value (e.g., a top-off current value) while the battery cell 450 is charged in the CV mode, the first charging circuit 421 may complete charging of the battery cell 450 by stopping the output of the power signal to the battery cell 450 based on the control of the processor 470.

The second charging circuit 422 may include a direct charging circuit that is configured to output the power signal without a power loss (or minimizing a power loss) to rapidly charge the battery cell 450 while adjusting the voltage value and current value of the input power signal. In an embodiment, the second charging circuit 422 may reduce the voltage value of the power signal received from the power supply device 401 through the overvoltage protection circuit 342 by a designated reduction and may increase the current value of the power signal by a designated magnification. For example, the battery cell 450 may be a 2S1P battery in which two battery cells are connected in series. A full-charge voltage of each cell may be 5V, and accordingly, a full-charge voltage value (e.g., a target voltage value) of the battery cell 450 may be configured to 10V. The second charging circuit 422 may include a 2:1 (or 4:2) direct charging integrated circuit ("DCIC") that reduces the voltage by ½ times and increases the current by 2 times. The processor 470 may recognize that the power supply device 401 supports a PPS function through PD communication with the power supply device 401 through the communication circuit 410. Accordingly, the processor 470 may deactivate the first charging circuit 421 and may activate the second charging circuit 422. The processor 470 may control the first switch circuit 431 to switch a charging path from the first charging circuit 421 to the second charging circuit 422. In an embodiment, the processor 470 may request transmission of a power signal having 20V and 3 A through PD communication from the power supply device 401. In response to the request, the power supply device 401 may transmit a power signal having the requested current and voltage values to the electronic device 300. The second charging circuit 422 may receive the power signal from the external connector 341 through the first switch circuit 431, and may reduce a voltage value of 20V of the received power signal to 10V and increase a current value of 3 A to 6 A to output the power signal.

In an embodiment, the battery pack 350 may include the charging terminal 351, the discharging terminal 352, a second switch circuit 432, the battery protection circuit 440, and the one or more battery cells 450.

The second switch circuit 432 may be located on a path through which the charging terminal 351, the discharging terminal 352, and the battery cell 450 are connected. For example, the power signal introduced into the battery pack 350 through the charging terminal 351 may be distributed in the second switch circuit 432. A portion of the distributed power signal may be supplied to the battery cell 450 so that the battery cell 450 can be charged, and a portion thereof may be supplied to the second substrate 360 through the discharging terminal 352 so that the supplied power signal can be used as power for operating the system 460.

The second switch circuit 432 may include a circuit configured to prevent (or stop) charging and/or discharging of the battery cell 450. For example, the second switch circuit 432 may include a charging control switch and a discharging control switch. The charging control switch of the second switch circuit 432 may allow the power signal introduced into the battery pack 350 through the charging terminal 351 to flow to the battery cell 450 or may stop the flow based on a charging control signal received from the battery protection circuit 440. The discharging control switch of the second switch circuit 432 may allow the power signal to flow from the battery cell 450 to the discharging terminal 352 or may stop the flow based on a discharging control signal received from the battery protection circuit 440.

The battery protection circuit 440 may monitor the current value of the power signal output from the battery cell 450 and/or the current value of the power signal flowing into the battery cell 450, and may output the monitoring result (e.g., data indicating the current value) to the processor 470. The battery protection circuit 440 may monitor a potential difference (voltage) between both ends (positive (+) pole and negative (−) pole) of the battery cell 450, and may output the monitoring result (data indicating the voltage value) to the processor 470. The voltage of the battery cell 450 and/or the current input to the battery cell 450 may be monitored by another circuit and provided to the processor 470. For example, a fuel gauge (e.g., a power gauge 230 in FIG. 2) may be included in the charging circuit 343. The fuel gauge may monitor the voltage of the battery cell 450. The fuel gauge may monitor a current value of a power signal output from the battery cell 450 and/or a current value of a power signal flowing into the battery cell 450. The fuel gauge may output the monitoring result to the processor 470. The battery protection circuit 440 may control the second switch circuit 432 based on the control signal received from the processor 470. For example, when the battery cell 450 is overcharged to a level in which the voltage of the battery cell 450 exceeds a configured maximum value (e.g., a target voltage value), the battery cell 450 may be damaged or explode. When the voltage of the battery cell 450 is excessively discharged to a level below a configured minimum value, the battery cell 450 may be in an unusable state. The battery protection circuit 440 may stop charging the battery cell 450 by opening the charging control switch in response to a charging stop command received from the processor 470. The battery protection circuit 440 may stop discharging the battery cell 450 by opening the discharging control switch in response to a discharging stop command received from the processor 470.

The power management circuit 362 (e.g., a power management integrated circuit ("PMIC")) may be connected to the discharging terminal 352 of the battery pack 350 through the second internal connector 361, and may receive power required by the system 460 through the discharging terminal 352 and supply the received power to the system 460. In an embodiment, the power management circuit 362 may include a voltage divider circuit configured to output a corresponding voltage by reducing the corresponding voltage to a voltage required by the system 460. For example, the battery cell 450 may be a 2S1P battery in which two battery cells are connected in series. A full-charge voltage of each cell may be 5V, and accordingly, a full-charge voltage value (e.g., the target voltage value) of the battery cell 450 may be configured to 10V. The power management circuit 362 may include a 2:1 voltage divider circuit for outputting the voltage of the power signal by reducing the voltage of 10V to 5V.

According to the above-described embodiment, a first charging path or a second charging path for supplying a power signal to the charging terminal 351 of the battery pack 350 through PD communication between the electronic device 300 and the power supply device 401 may be provided on the first substrate 340. For example, when the power supply device 401 does not support the PPS function, the processor 470 may control the first switch circuit 431 to allow the first charging path following the external connector 341, the overvoltage protection circuit 342, the first charging circuit 421, and the first internal connector 344 connected to the charging terminal 351 in the stated order to be provided on the first substrate 340. When the power supply device 401 supports the PPS function, the processor 470 may control the first switch circuit 431 to allow the second charging path following the external connector 341, the overvoltage protection circuit 342, the second charging circuit 422, and the first internal connector 344 connected to the charging terminal 351 in the stated order to be provided on the first substrate 340. The charging path may be provided on the first substrate 340 where the charging circuit 343 is located, but is not provided on the second substrate 360 on which the system 460 is located, so that power loss during charging can be minimized and a problem of heat generation can be solved.

According to the above-described embodiment, a discharging path for supplying power to the system 460 may be provided on the second substrate 360. For example, a discharging path following the second internal connector 361 connected to the discharging terminal 352, the power management circuit 362, and the system 460 in the stated order may be provided on the second substrate 360. The discharge path may be provided on the second substrate 360 where the system 460 is located, but may not be provided on the first substrate 340, so that power loss during discharging can be minimized and problems of interruption of the operation of the system 460 and the occurrence of an error can be solved.

According to the above-described embodiment, the charging circuit 343 may be provided on the first substrate 340, the power management circuit 362 may be provided on the second substrate 3460, and the first substrate 340 and the second substrate 360 may be disposed on different sides of the battery pack 350 (e.g., opposite sides of the battery pack as illustrated in FIG. 3B). By separately locating these major heating sources (i.e., the charging circuit 343 and the power management circuit 362), the problem of heat generation can be solved.

In various embodiments, an electronic device (e.g., the electronic device 300 in FIGS. 3 and 4) may include a housing and a battery pack positioned inside the housing and including a charging terminal, a discharging terminal, and at least one battery cell. A first substrate is positioned inside the housing and connected to the charging terminal and a second substrate is positioned inside the housing and connected to the discharging terminal. An external connector is mounted on the first substrate and connected to an external power supply device. A first internal connector is mounted on the first substrate and connected to the charging terminal. A second internal connector is mounted on the second substrate and connected to the discharging terminal. A charging circuit is mounted on the first substrate and configured to receive a first power signal from the power supply device through the external connector, to adjust a current and/or voltage of the received first power signal, and to output the adjusted first power signal to the charging terminal through the first internal connector. A system of the electronic device is mounted on the second substrate. A power management circuit is mounted on the second substrate and configured to receive a second power signal for the system to operate from the discharging terminal through a second internal connector, and to supply the received second power signal to the system.

The battery pack (e.g., battery pack 350 in FIGS. 3A, 3B, 4) may be disposed between the first substrate (e.g., the first substrate 340 of FIGS. 3 and 4) and the second substrate (e.g., the second substrate 360 in FIGS. 3A, 3B, 4). The charging terminal (e.g., charging terminal 351) may be disposed adjacent to the first internal connector (e.g., the first internal connector 344) as compared to the discharging terminal (e.g., discharging terminal 352). The discharging terminal may be disposed adjacent to the second internal connector (e.g., the second internal connector 361 in FIGS. 3 and 4) as compared to the charging terminal.

A processor (e.g., the processor 470 in FIG. 4) may be included in the system, a communication circuit for communication with the power supply device may be mounted on the first substrate, and the processor may be configured to control the charging circuit based on information related to the power supply device received through the communication circuit.

The charging circuit (e.g., charging circuit 343) may include a first charging circuit (e.g., the first charging circuit 421) configured to adjust a current and/or voltage of the first power signal and a second charging circuit (e.g., the second charging circuit 422) configured to reduce the voltage of the first power signal by a designated reduction and to increase the current of the first power signal by a designated magnification. The processor may be configured to charge the battery cell using the second charging circuit based on confirmation that the power supply device is a model supporting a programmable power supply (PPS) function through the communication circuit. The processor may be configured to charge the battery cell using the first charging circuit based on confirmation that the power supply device is not the model supporting the PPS function through the communication circuit.

The communication circuit may be built into the first charging circuit.

The processor may be configured to request, from the power supply device, transmission of a power signal having a voltage value twice a target voltage value for the battery cell through the communication circuit. The second charging circuit may be configured to reduce the voltage of the first power signal by ½ times and to increase the current of the first power signal by 2 times.

The external connector may be configured as a socket according to a universal serial bus (USB) Type-C, and the charging circuit may be configured to receive the first power signal through a power pin configured in the socket.

The electronic device may further include a communication circuit (e.g., the communication circuit 410 in FIG. 4) configured to be mounted on the first substrate, wherein the communication circuit may be configured to perform power delivery (PD) communication with the power supply device through a signal pin configured in the socket. The signal pin may include a configuration channel (CC)1 pin and a CC2 pin.

The housing may include a front cover configured to form a front surface of the electronic device, a rear cover configured to form a rear surface of the electronic device, and a side bezel structure configured to form a side surface surrounding a space between the front surface and the rear surface. When viewed while facing the rear surface, the first substrate may be positioned below the battery pack and the second substrate may be positioned above the battery pack, and the charging terminal and the discharging terminal may be positioned adjacent to one side of the side bezel structure.

A hole may be formed on a lower side of the side bezel structure, and the external connector may be coupled to a plug of an external cable introduced through the hole.

In various embodiments, an electronic device (e.g., the electronic device 300 in FIGS. 3 and 4) may include a battery pack including a charging terminal, a discharging terminal, and a battery cell; a first substrate connected to the charging terminal and disposed on a first side of the battery pack; a second substrate connected to the discharging terminal and disposed on a second side of the battery pack opposite to the first side; an external connector mounted on the first substrate and configured to provide a connection to an external power supply device; a first internal connector mounted on the first substrate and connected to the charging terminal; a second internal connector mounted on the second substrate and connected to the discharging terminal; a charging circuit mounted on the first substrate, and configured to receive a first power signal from the power supply device through the external connector, to adjust a current and/or voltage of the received first power signal, and to output an adjusted first power signal to the charging terminal through the first internal connector; a system of the electronic device configured to be mounted on the second substrate; and a power management circuit mounted on the second substrate, and configured to receive a second power signal from the discharging terminal through the second internal connector, and to supply the received second power signal to the system.

The embodiments of the disclosure disclosed in the present specification and drawings are merely provided for specific examples in order to easily explain the technical contents according to the embodiments of the disclosure and help the understanding of the embodiments of the disclosure, it is not intended to limit the scope of the embodiments of the disclosure. Therefore, in the scope of various embodiments of the disclosure, in addition to the embodiments disclosed herein, all changes or modifications derived from the technical ideas of various embodiments of the disclosure should be interpreted as being included in the scope of various embodiments of the disclosure.

What is claimed is:

1. An electronic device comprising:
a housing;
a battery pack positioned inside the housing and including a charging terminal, a discharging terminal, and at least one battery cell;
a first substrate positioned inside the housing and connected to the charging terminal;
a second substrate positioned inside the housing and connected to the discharging terminal;
an external connector mounted on the first substrate to be connected to an external power supply device;
a first internal connector mounted on the first substrate and configured to provide the connection to the charging terminal;
a second internal connector mounted on the second substrate and configured to provide the connection to the discharging terminal;
a charging circuit mounted on the first substrate and configured to receive a first power signal from the external power supply device through the external connector, to adjust a current and/or voltage of the received first power signal, and to output the adjusted first power signal to the charging terminal through the first internal connector;
a communication circuit for communication with the external power supply device;
a system of the electronic device mounted on the second substrate and including a processor; and
a power management circuit mounted on the second substrate and configured to receive a second power signal for the system to operate, the second power signal received from the discharging terminal through the second internal connector, the power management circuit configured to supply the received second power signal to the system,
wherein the charging circuit includes a first charging circuit configured to adjust a current and/or voltage of the first power signal; and a second charging circuit configured to reduce the voltage of the first power signal by a designated reduction and to increase the current of the first power signal by a designated magnification, and
wherein the processor is configured to:
charge the battery cell using the second charging circuit based on confirmation through the communication circuit that the external power supply device supports a programmable power supply function, and
charge the battery cell using the first charging circuit based on confirmation through the communication circuit that the external power supply device does not support the programmable power supply function.

2. The electronic device of claim 1, wherein
the battery pack is disposed between the first substrate and the second substrate within the housing,
the charging terminal is disposed adjacent to the first internal connector, and
the discharging terminal is disposed adjacent to the second internal connector mounted on the second substrate.

3. The electronic device of claim 1, wherein
the communication circuit is mounted on the first substrate.

4. The electronic device of claim 1, wherein the communication circuit is built into the first charging circuit.

5. The electronic device of claim 1, wherein
the processor is configured to request through the communication circuit, from the external power supply device, transmission of a power signal having a voltage value twice a target voltage value for the battery cell, and
the second charging circuit is configured to reduce the voltage of the first power signal by ½ times and to increase the current of the first power signal by 2 times.

6. The electronic device of claim 1, wherein the external connector is configured as a socket according to a universal serial bus Type-C, and the charging circuit is configured to receive the first power signal through a power pin configured in the socket.

7. The electronic device of claim 6,
wherein the communication circuit is configured to perform power delivery communication with the external power supply device through a signal pin configured in the socket.

8. The electronic device of claim 7, wherein the signal pin includes a configuration channel (CC)1 pin and a CC2 pin.

9. The electronic device of claim 1, wherein
the housing includes a front cover configured to form a front surface of the electronic device; a rear cover configured to form a rear surface of the electronic device; and a side bezel structure configured to form a side surface surrounding a space between the front surface and the rear surface, and
when viewed while facing the rear surface, the first substrate is positioned below the battery pack and the second substrate is positioned above the battery pack, and the charging terminal and the discharging terminal are positioned adjacent to one side of the side bezel structure.

10. The electronic device of claim 9, wherein
a hole is formed on a lower side of the side bezel structure, and
the external connector is configured to couple to a plug of an external cable introduced through the hole.

11. An electronic device comprising:
a battery pack including a charging terminal, a discharging terminal, and a battery cell;
a first substrate connected to the charging terminal and disposed on a first side of the battery pack;
a second substrate connected to the discharging terminal and disposed on a second side of the battery pack opposite to the first side;
an external connector mounted on the first substrate and configured to provide a connection to an external power supply device;
a first internal connector mounted on the first substrate and connected to the charging terminal;
a second internal connector mounted on the second substrate and connected to the discharging terminal;
a charging circuit mounted on the first substrate, and configured to receive a first power signal from the external power supply device through the external connector, to adjust a current and/or voltage of the received first power signal, and to output an adjusted first power signal to the charging terminal through the first internal connector;
a communication circuit for communication with the external power supply device and including a processor;
a system of the electronic device configured to be mounted on the second substrate; and
a power management circuit mounted on the second substrate, and configured to receive a second power signal from the discharging terminal through the second internal connector, and to supply the received second power signal to the system,
wherein the charging circuit includes a first charging circuit configured to adjust a current and/or voltage of the first power signal; and a second charging circuit configured to reduce the voltage of the first power signal by a designated reduction and to increase the current of the first power signal by a designated magnification, and
wherein the processor is configured to:
charge the battery cell using the second charging circuit based on confirmation through the communication circuit that the external power supply device supports a programmable power supply function, and
charge the battery cell using the first charging circuit based on confirmation through the communication circuit that the external power supply device does not support the programmable power supply function.

12. The electronic device of claim 11, wherein the communication circuit is mounted on the first substrate.

13. The electronic device of claim 11, wherein the communication circuit is built into the first charging circuit.

14. The electronic device of claim 11, wherein
the processor is configured to request through the communication circuit, from the external power supply device, transmission of a power signal having a voltage value twice a target voltage value for the battery cell, and
the second charging circuit is configured to reduce the voltage of the first power signal by ½ times and to increase the current of the first power signal by 2 times.

15. The electronic device of claim 11, wherein the external connector is configured as a socket according to a universal serial bus Type-C, and the charging circuit is configured to receive the first power signal through a power pin configured in the socket.

16. The electronic device of claim 15,
wherein the communication circuit is configured to perform power delivery communication with the external power supply device through a signal pin configured in the socket.

17. The electronic device of claim 16, wherein the signal pin includes a configuration channel (CC)1 pin and a CC2 pin.

18. The electronic device of claim 11, further comprising a housing, wherein
the housing includes a front cover configured to form a front surface of the electronic device; a rear cover configured to form a rear surface of the electronic device; and a side bezel structure configured to form a side surface surrounding a space between the front surface and the rear surface, and
when viewed while facing the rear surface, the first substrate is positioned below the battery pack and the second substrate is positioned above the battery pack, and the charging terminal and the discharging terminal are positioned adjacent to one side of the side bezel structure.

\* \* \* \* \*